(12) United States Patent  
Sakyo et al.

(10) Patent No.: US 6,582,010 B2
(45) Date of Patent: Jun. 24, 2003

(54) CAB FOR CONSTRUCTION MACHINERY

(75) Inventors: Tsuyoshi Sakyo, Chiyoda-machi (JP); Kazunori Komatsu, Chiyoda-machi (JP); Katsuhiro Satou, Yamato (JP)

(73) Assignees: Hitachi Construction Machinery Co., Ltd., Tokyo (JP); Press Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 10/111,598

(22) PCT Filed: Sep. 13, 2001

(86) PCT No.: PCT/JP01/07963
§ 371 (c)(1),
(2), (4) Date: Apr. 26, 2002

(87) PCT Pub. No.: WO02/22967
PCT Pub. Date: Mar. 21, 2002

(65) Prior Publication Data
US 2002/0153748 A1 Oct. 24, 2002

(30) Foreign Application Priority Data
Sep. 18, 2000 (JP) ........................................ 2000-282394

(51) Int. Cl.⁷ .................................................. B60J 7/00
(52) U.S. Cl. .................................................. 296/190.08
(58) Field of Search .................... 296/190.08, 77.1, 296/219, 215; 180/69.2, 316; 405/288; 414/718

(56) References Cited

U.S. PATENT DOCUMENTS

| | | | | |
|---|---|---|---|---|
| 4,023,851 A | * | 5/1977 | Palmer et al. | 296/190.08 |
| 4,695,342 A | * | 9/1987 | Belleau et al. | 296/190.08 |
| 4,772,065 A | * | 9/1988 | Nakata et al. | 296/190.08 |
| 4,781,260 A | * | 11/1988 | Morita et al. | 296/190.08 |
| 5,273,340 A | * | 12/1993 | Nelson et al. | 296/190.08 |
| 5,820,199 A | * | 10/1998 | Camplin et al. | 296/190.08 |
| 6,065,799 A | * | 5/2000 | Suwabe et al. | 296/190.08 |
| 6,149,228 A | * | 11/2000 | O'Neill et al. | 296/190.08 |
| 6,206,446 B1 | * | 3/2001 | Slayden | 296/77.1 |
| 6,494,526 B2 | * | 12/2002 | Uno | 296/190.08 |
| 2001/0004950 A1 | * | 6/2001 | Mizuta | 180/69.2 |
| 2001/0008346 A1 | * | 7/2001 | Martin | 296/190.08 |
| 2002/0149232 A1 | * | 10/2002 | Sakyo et al. | 296/190.08 |

FOREIGN PATENT DOCUMENTS

| | | | |
|---|---|---|---|
| FR | 2 569 154 | * | 2/1986 |
| JP | 57 107961 | * | 7/1982 |
| JP | 60 154962 | * | 8/1985 |
| JP | 63 162381 | * | 7/1988 |
| JP | 3 287475 | * | 12/1991 |
| JP | 8-260518 | | 10/1996 |
| JP | 9 109922 | * | 4/1997 |
| JP | 11-166247 | | 6/1999 |
| JP | 2000-198469 | | 7/2000 |
| JP | 2000-234352 | | 8/2000 |
| JP | 2001 115491 | * | 4/2001 |

\* cited by examiner

*Primary Examiner*—Kiran Patel
(74) *Attorney, Agent, or Firm*—Mattingly, Stanger & Malur, P.C.

(57) ABSTRACT

Front mount bases (14, 15) which are located at four corner portions under a cab (11) are constituted by base plates (14A, 15A) and fitting joint projections (14B, 15B), and rear mount bases (16, 17) are constituted by base plates (16A, 17A) and fitting joint projections (16B, 17B). On the other hand, front pillars (22, 23) to be erected on the front mount bases (14, 15) are provided with notched portions (22B, 23B) for fitting engagement with the fitting joint projections (14B, 15B), respectively. Rear pillars (24, 25) to be erected on the rear mount bases (16, 17) are provided with notched portions (24A, 25A) for fitting engagement with the fitting joint projections (16B, 17B). Accordingly, a weld can be formed along and between marginal edge portions around the fitting joint projections (14B, 15B, 16B, 17B) and notched portion (22B, 23B, 24A, 25A) in such a way as to increase the welding distance and to increase the strength of the welded joint portions.

3 Claims, 14 Drawing Sheets

CAB FOR CONSTRUCTION MACHINERY

TECHNICAL FIELD

This invention relates to a cab for construction machines, which can be suitably applied, for example, to hydraulic excavators, hydraulic cranes and the like.

BACKGROUND ART

Generally, construction machines such as hydraulic excavators, for example, are largely constituted by a lower structure, an upper structure which is rotatably mounted on the lower structure, and a working mechanism which is provided on a front portion of the upper structure for lifting loads up and down. A cab is provided on a revolving frame of the upper structure as an operating room to be occupied by an operator at the control of the machine.

The cabs of hydraulic excavators of this sort are usually formed in a box-like shape, from a standpoint of protecting operators. As for an example of such cabs for hydraulic excavators, there has been known a box-like cab construction, including mount bases located at four corners and each provided with an upward fitting joint projection, base link frames connecting the four mount bases in transverse and longitudinal directions, right and left front pillars erected on right front and left front mount bases, right and left rear pillars erected on right rear and left rear mount bases, right and left roof pillars connecting upper end portions of the front and rear pillars, a front tie frame connecting upper end portions of right and left front pillars, and a rear tie frame connecting upper end portions of right and left rear pillars (e.g., as disclosed in Japanese Laid-Open Patent Publication No. 2000-198469).

In an assembling stage, the prior art cab is built up firstly by fitting lower ends of left and right front pillars on the fitting joint projection of the mount bases, and is welding fitted lower ends of the respective pillars to the mount bases to erect them thereon.

More specifically, in the case of the above-mentioned prior art construction machine cab, front and rear pillars are erected on mount bases by fitting lower ends of the respective pillars on joint projections which are provided on the side of the mount bases and forming a weld around the circumference of distal end portions which are abutted on the respective mount bases.

However, when welding a lower end of a pillar which is abutted against a mount base, a weld can be formed only around the circumference of distal or root end which is abutted against the mount base. Therefore, due to a limit on the welding distance, it has been difficult to enhance the strength of the weld joint portions of a pillar and a mount base. In addition, because of concentration of stress at a distal end portion or root portion of an erected pillar, the weld which is formed only around the circumference of abutted distal end portions of a pillar is susceptible to damages, which can detrimentally impair the reliability of the machine.

DISCLOSURE OF THE INVENTION

In view of the above-discussed problem with the prior art, it is an object of the present invention to provide a cab for a construction machine, which is so arranged to facilitate positioning of left and right front pillars as well as left and right rear pillars on the respective mount bases and at the same time to increase the strength of their joint portions.

According to the present invention, there is provided a cab for construction machines, including mount bases located at four corners and each provided with an upward fitting joint projection; base link frames arranged to connect the mount bases in transverse and longitudinal directions of a machine; left and right front pillars erected on left and right front mount bases; left and right rear pillars erected on left and right rear mount bases; left and right roof pillars arranged to longitudinally connect upper end portions of the front and rear pillars; a front tie frame arranged to transversely connect upper end portions of the left and right front pillars; and a rear tie frame arranged to transversely connect upper end portions of the left and right rear pillars.

In order to solve the above-discussed problems with the prior art, the cab according to the present invention as defined in claim 1 comprises: a notched portion provided in a lower end portion of each one of the front and rear pillars for fitting engagement with the fitting joint projection of the mount base; a lower end portion of each one of the front and rear pillars being fitted on the fitting joint projection of the mount base and securely fixed to the latter by a weld formed along and between marginal edge portions around the notched portion and the fitting joint projection.

With the arrangements just described, the respective front and rear pillars can be readily and correctly set in position on the respective mount bases by engagement with the fitting joint projections. In addition, in welding lower end portions of the front and rear pillars to the respective mount bases, a weld can be formed along and between marginal edge portions around the notched portions and the fitting joint projections in such a way as to prolong the welding distance and away from a distal or root end portion of the pillar where concentration of stress occurs. Thus, the above arrangements make it possible to increase the strength of welded joint portions.

According to a preferred form of the present invention, the notched portion in each one of the front and rear pillars is in the form of an opening of an inverted U-shape corresponding to profile of the fitting joint projection on the side of the mount base.

With the arrangements just described, a pillar which is set in position on a mount base, with its notched portion in engagement with a fitting joint projection on the side of the mount base, can be securely welded to the latter by forming a weld over a longer distance along and between marginal edge portions around the notched portion and the fitting joint projection.

Further, according to another preferred form of the present invention, the mount bases are each constituted by a base plate to be fixed on the side of a vehicle body, and a fitting joint projection rising upward from the base plate in such a way as to plug the notched portion.

With the arrangements just described, upon bringing a lower end portion of a pillar into fitting engagement with a fitting joint projection on a mount base, a notched portion in the lower end portion of the pillar is plugged with the fitting joint projection, so that a stronger weld can be formed along marginal edge portions around the notched portion which is in abutting engagement with the fitting joint projection of the mount base.

BEST MODE FOR CARRYING OUT THE INVENTION

Hereafter, the construction machine cab according to the present invention is described more particularly by way of its preferred embodiments which are by way of example applied to a hydraulic excavator, with reference to FIGS. 1 through 13.

In the accompanying drawings, indicated at 1 is a lower structure of the hydraulic excavator, and at 2 an upper structure which is rotatably mounted on the lower structure 1. A front working mechanism 3 is provided on a front portion of the upper structure 2 for lifting a front attachment up and down, for example, for an excavating operation.

Figure 1:
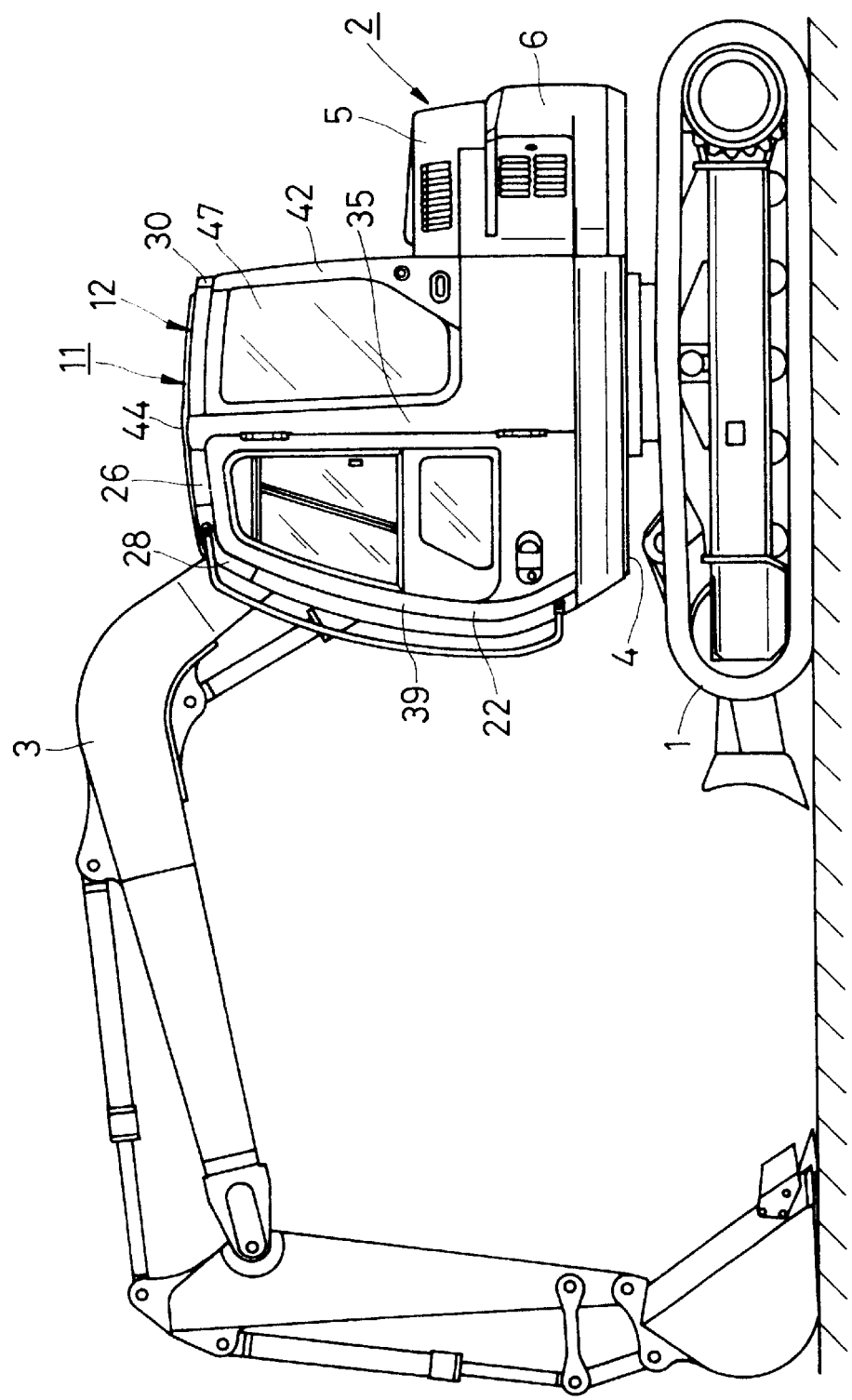
FIG. 1 is a front view of a hydraulic excavator incorporating an embodiment of the present invention.
Figure 2:
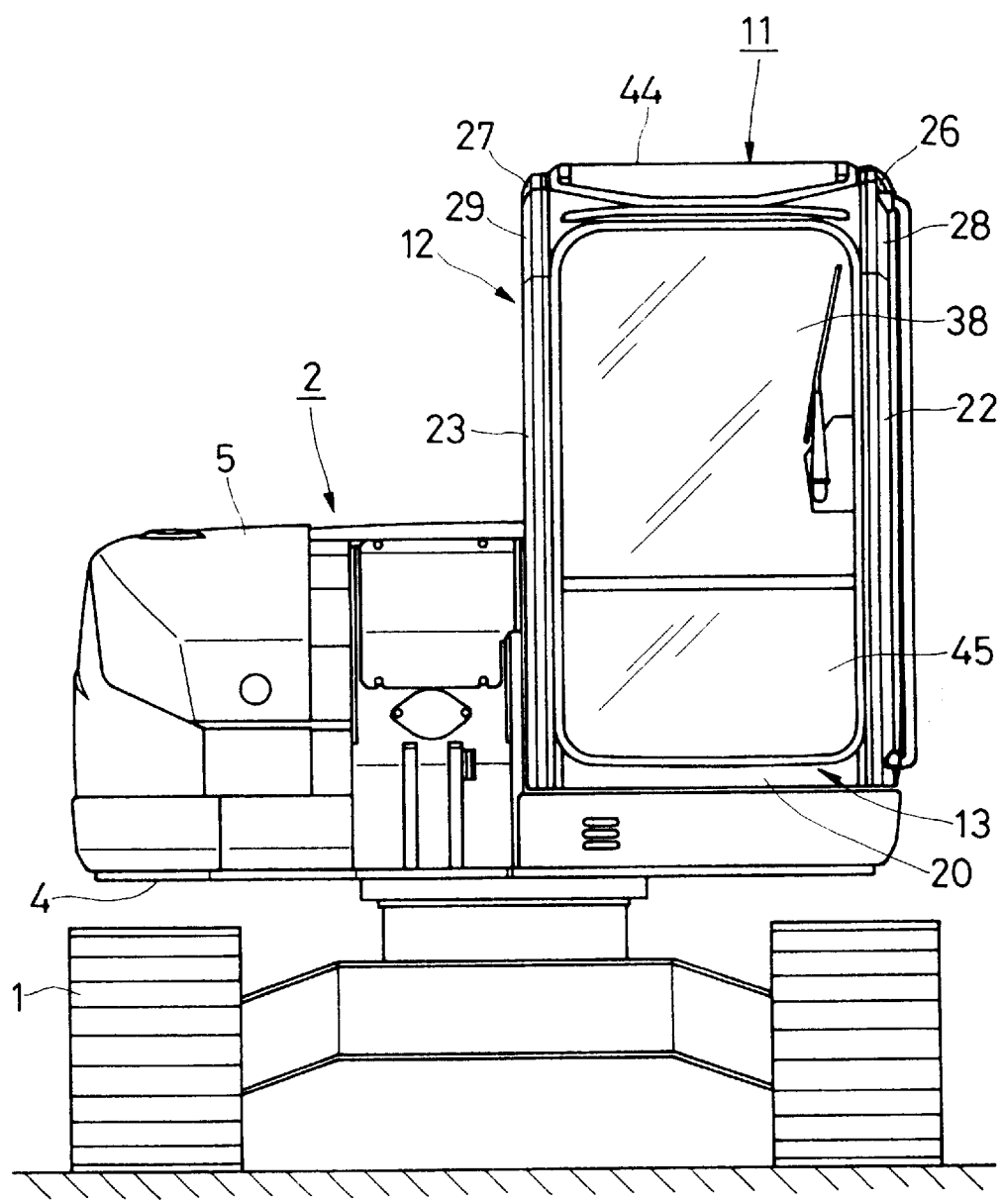
FIG. 2 is an enlarged left-hand side view of the hydraulic excavator, with a front working mechanism omitted for the convenience of illustration.
Figure 3:
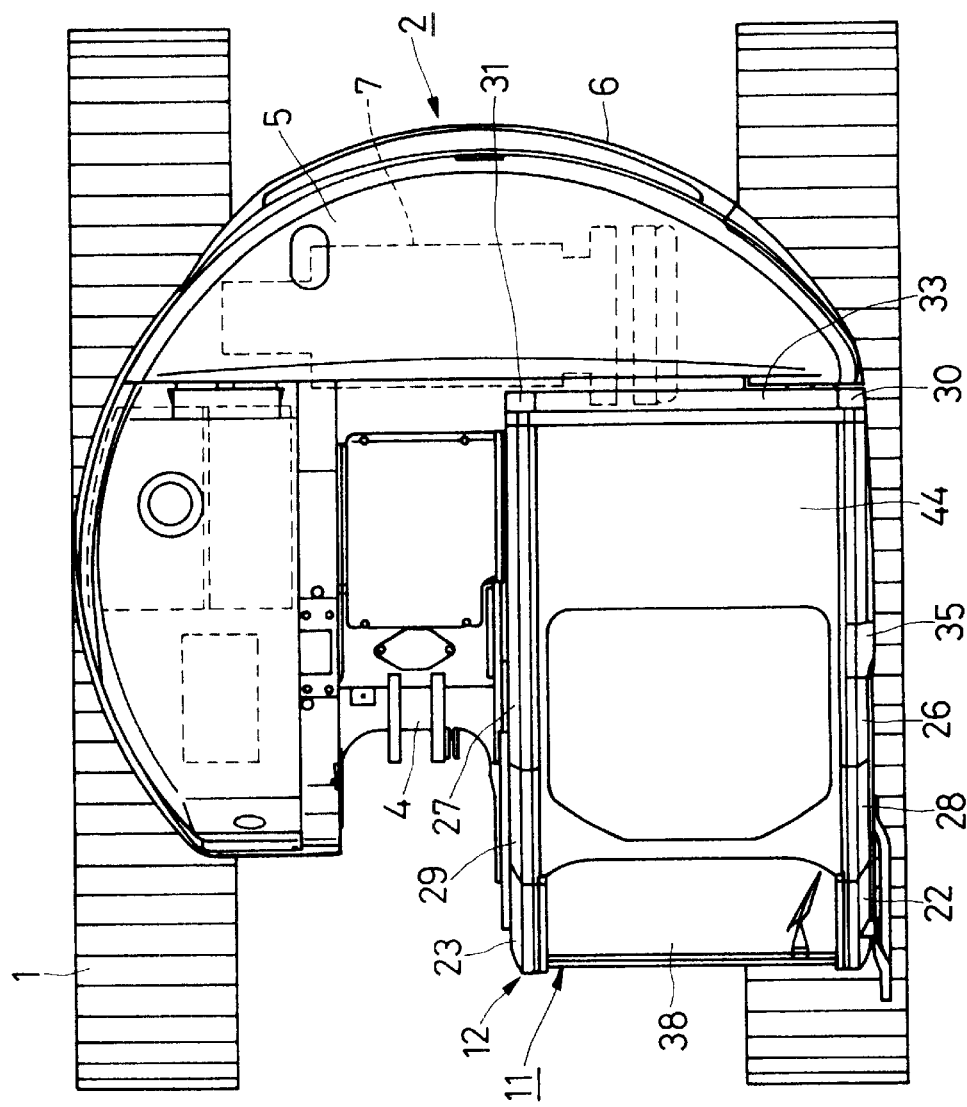
FIG. 3 is a plan view of the hydraulic excavator shown in FIG. 2.

The upper structure 2 is largely constituted by a revolving frame 4, a cab 11 which is mounted on a left front portion of the revolving frame 4, which will be described hereinafter, an outer shield cover 5 which is provided on the revolving frame 4 and on the right and rear sides of the cab 11 as shown in FIGS. 2 and 3, a counterweight 6 which is attached to the rear end of the revolving frame 4, and an engine 7 which is mounted transversely on the revolving frame 4 at a position on the rear side of the cab 11.

Figure 4:
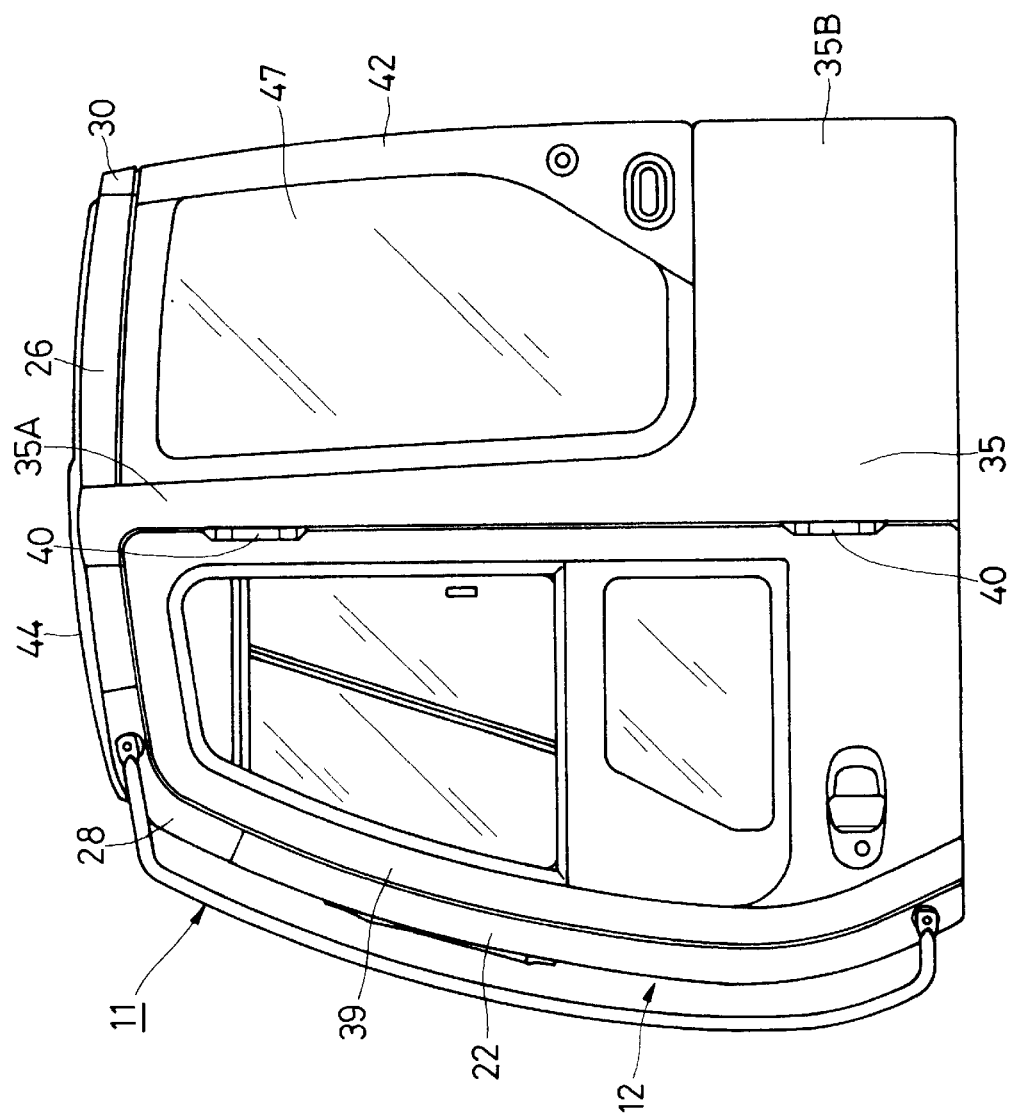
FIG. 4 is an enlarged front view of the cab shown in FIG. 1.
Figure 5:
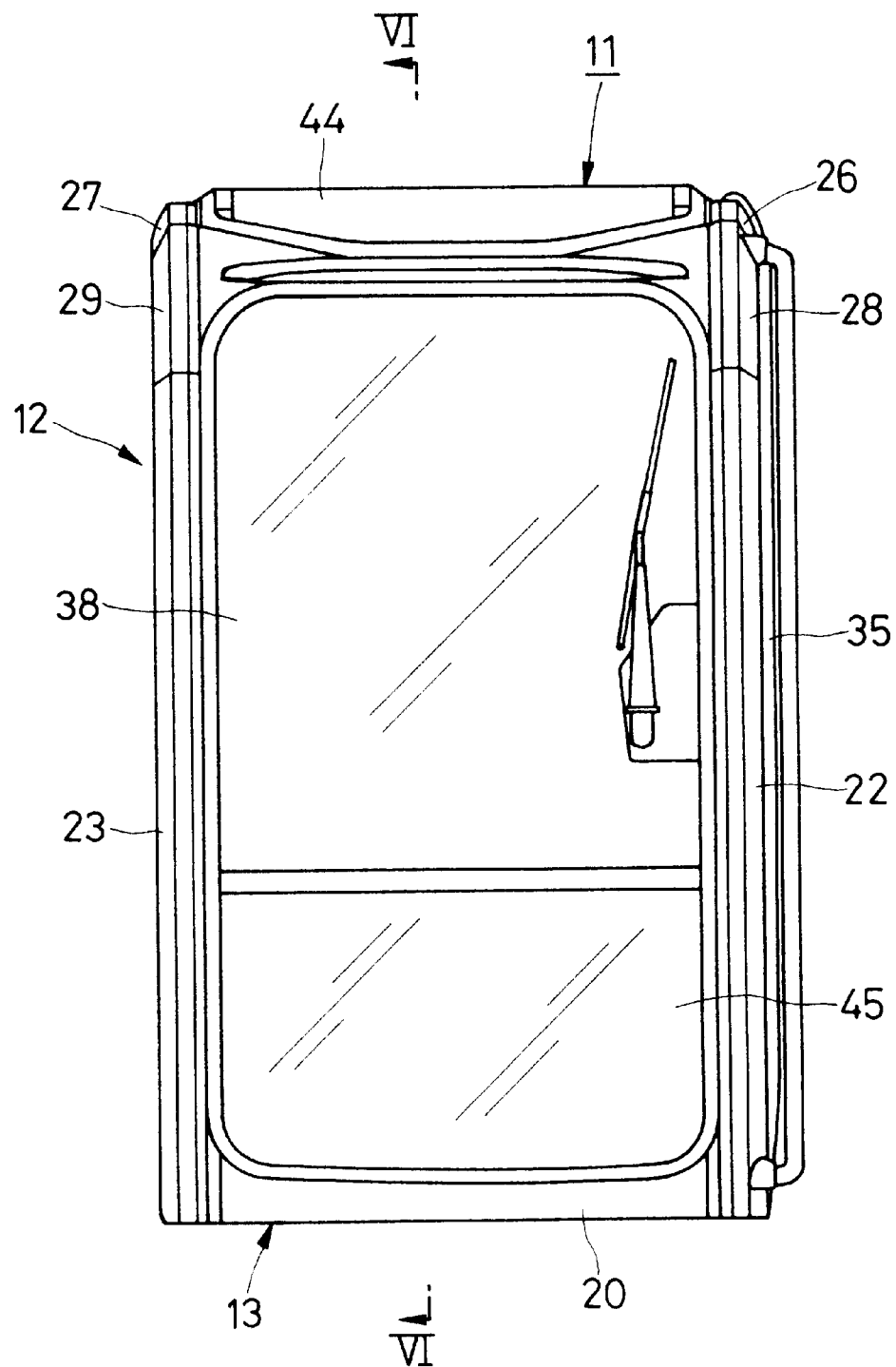
FIG. 5 is a left-hand side view of the cab shown in FIG. 4.
Figure 6:
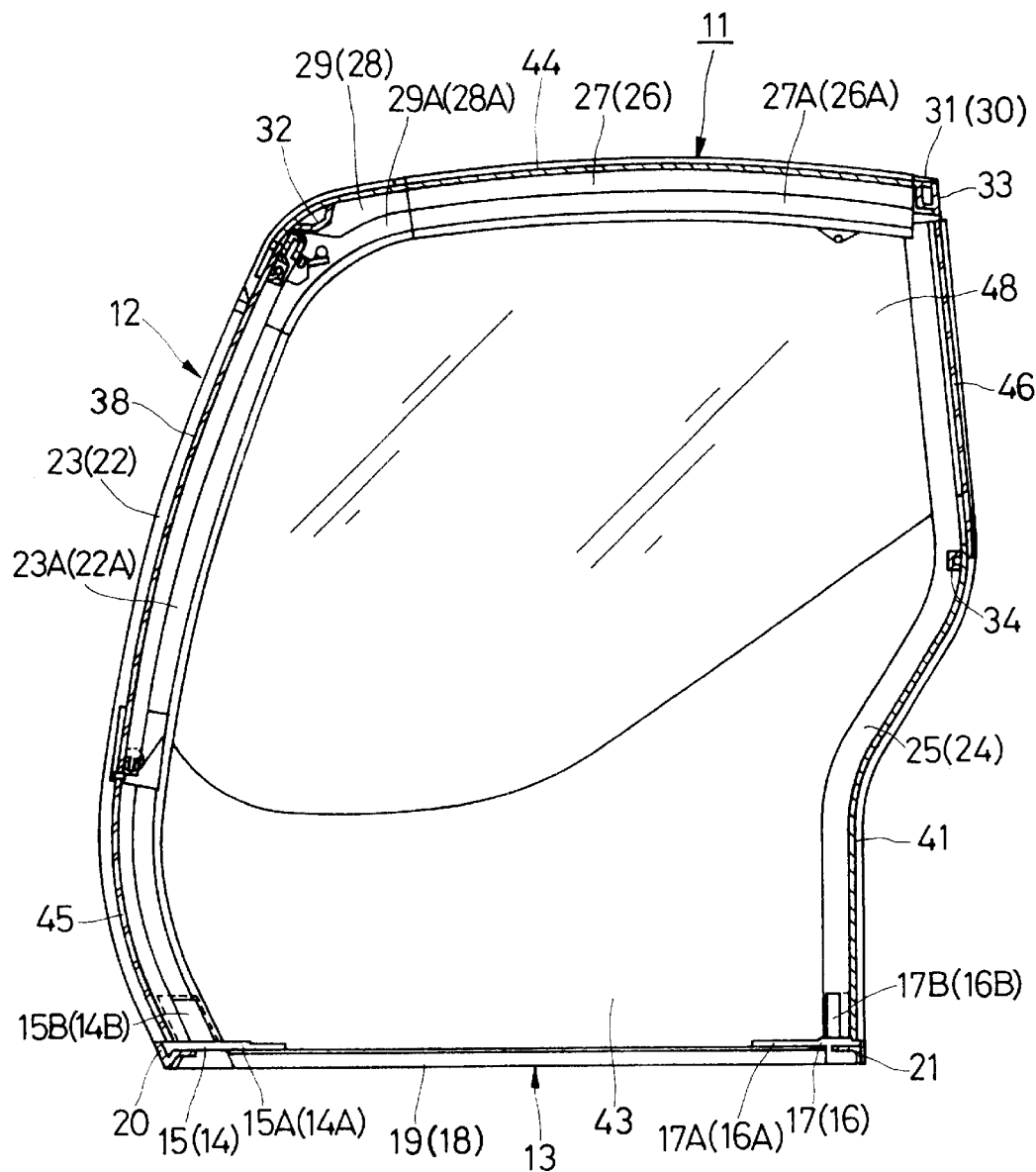
FIG. 6 is a sectional view of the cab, taken in the direction of arrows VI—VI of FIG. 5.

Indicated at 11 is the cab which is mounted on a left front portion of the revolving frame 4 to provide an operating room to be occupied by an operator at the control of the machine. The cab 11 is internally provided with an operator's seat along with various operating and control levers (none of which is shown). As shown in FIGS. 4 to 6, the cab 11 is largely constituted by a cab frame 12, front window 38, door 39, rear panel 41, side panel 43, roof panel 44, front window glass 45, rear window glass 46, left side window glass 47 and right side window glass 48, which will be described in greater detail hereinafter.

Figure 7:
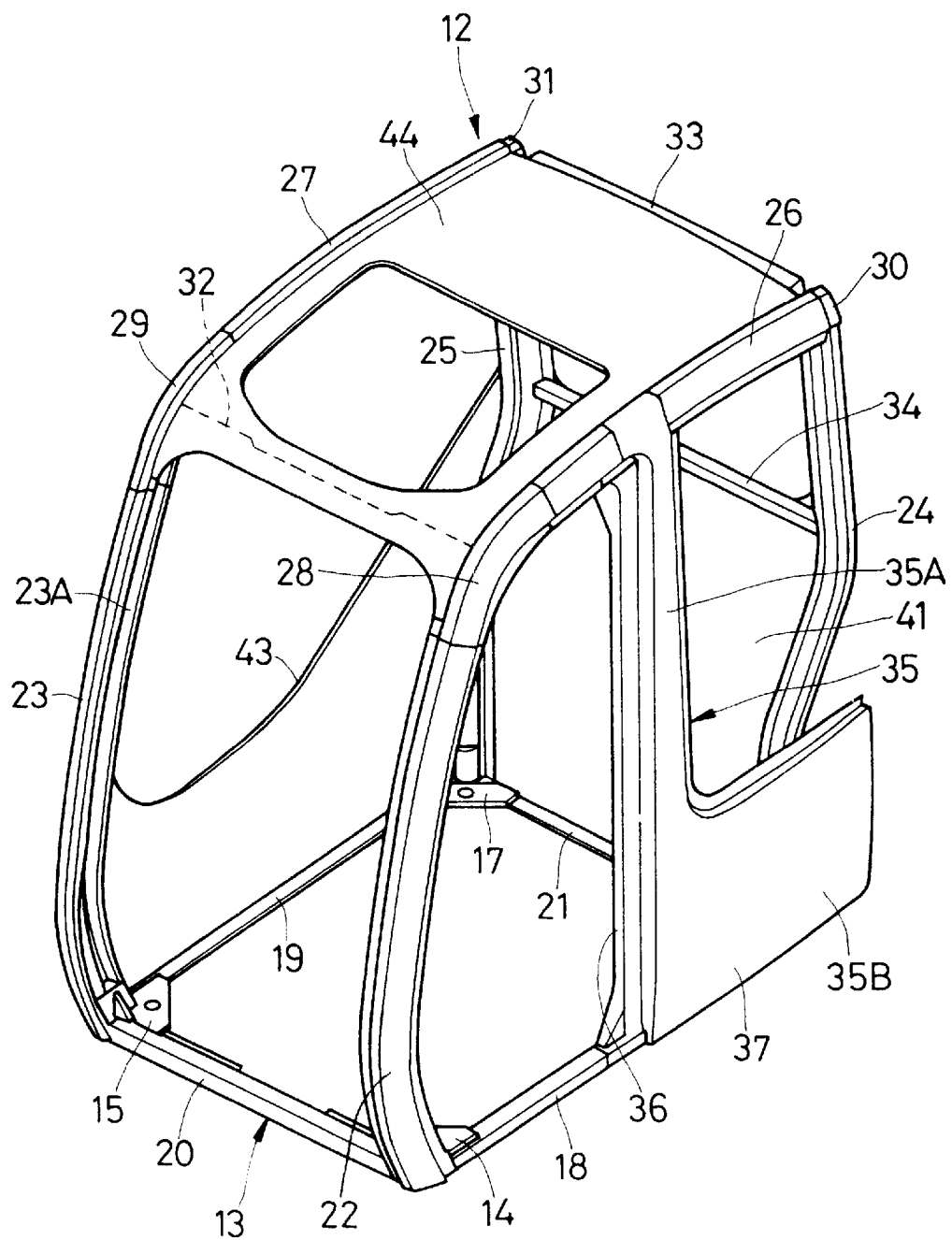
FIG. 7 is a perspective view of a cab frame.
Figure 8:
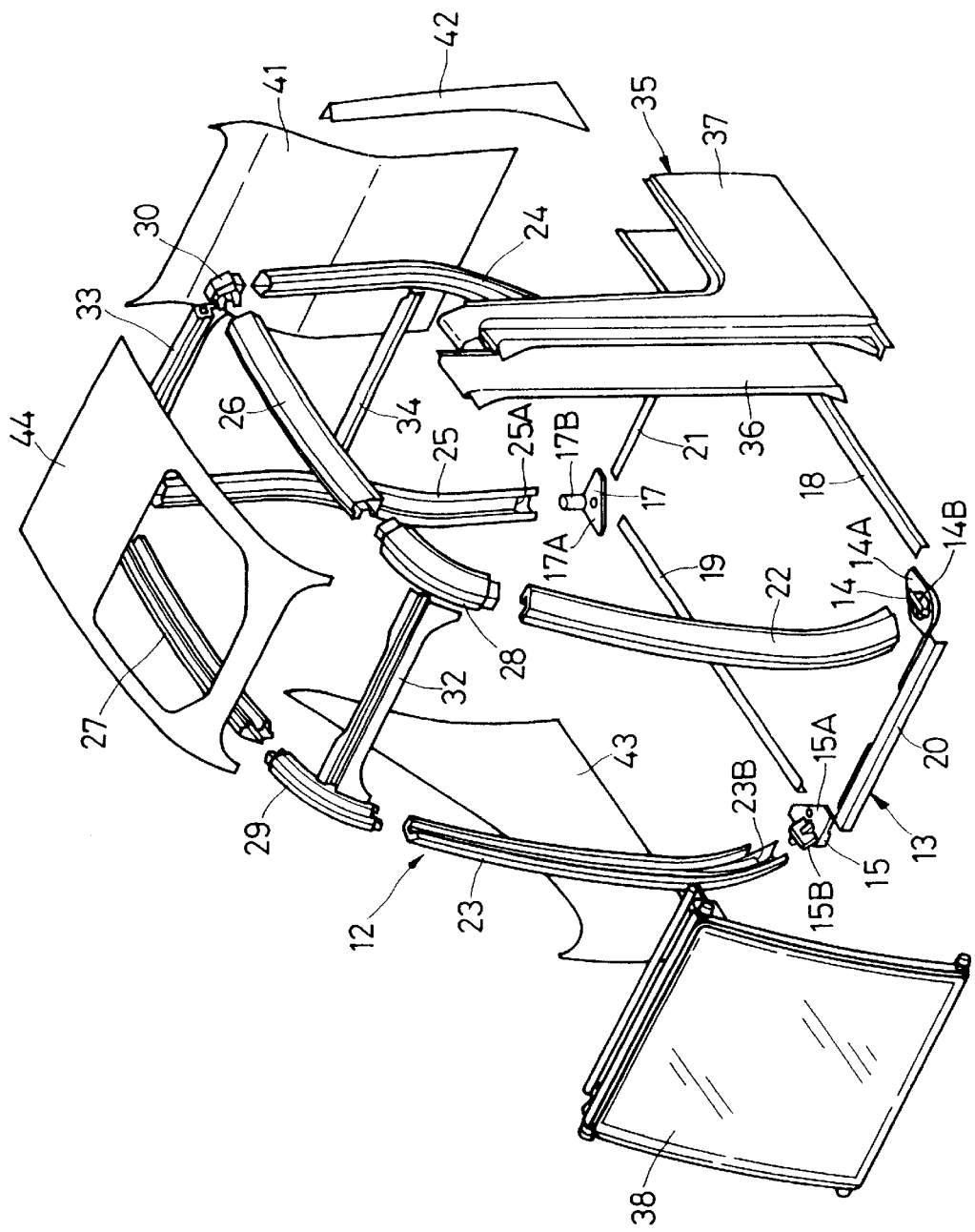
FIG. 8 is an exploded perspective view of the cab frame.

Denoted at 12 is the cab frame which forms a bone structure of the cab 11. As shown in FIGS. 7 and 8, the cab frame 12 is constituted by a base frame 13, front pillars 22 and 23, rear pillars 24 and 25, roof pillars 26 and 27, front joint members 28 and 29, rear joint members 30 and 31, front tie frame 32, rear tie frame 33 and center pillar 35, which will be described after. With regard to symmetrically arranged component parts, including the front pillars, rear pillars, roof pillars, front joint members and rear joint members, only the component parts on the right side are shown in the drawings, and the component parts on the left side are indicated by a reference numeral in brackets.

Figure 9:
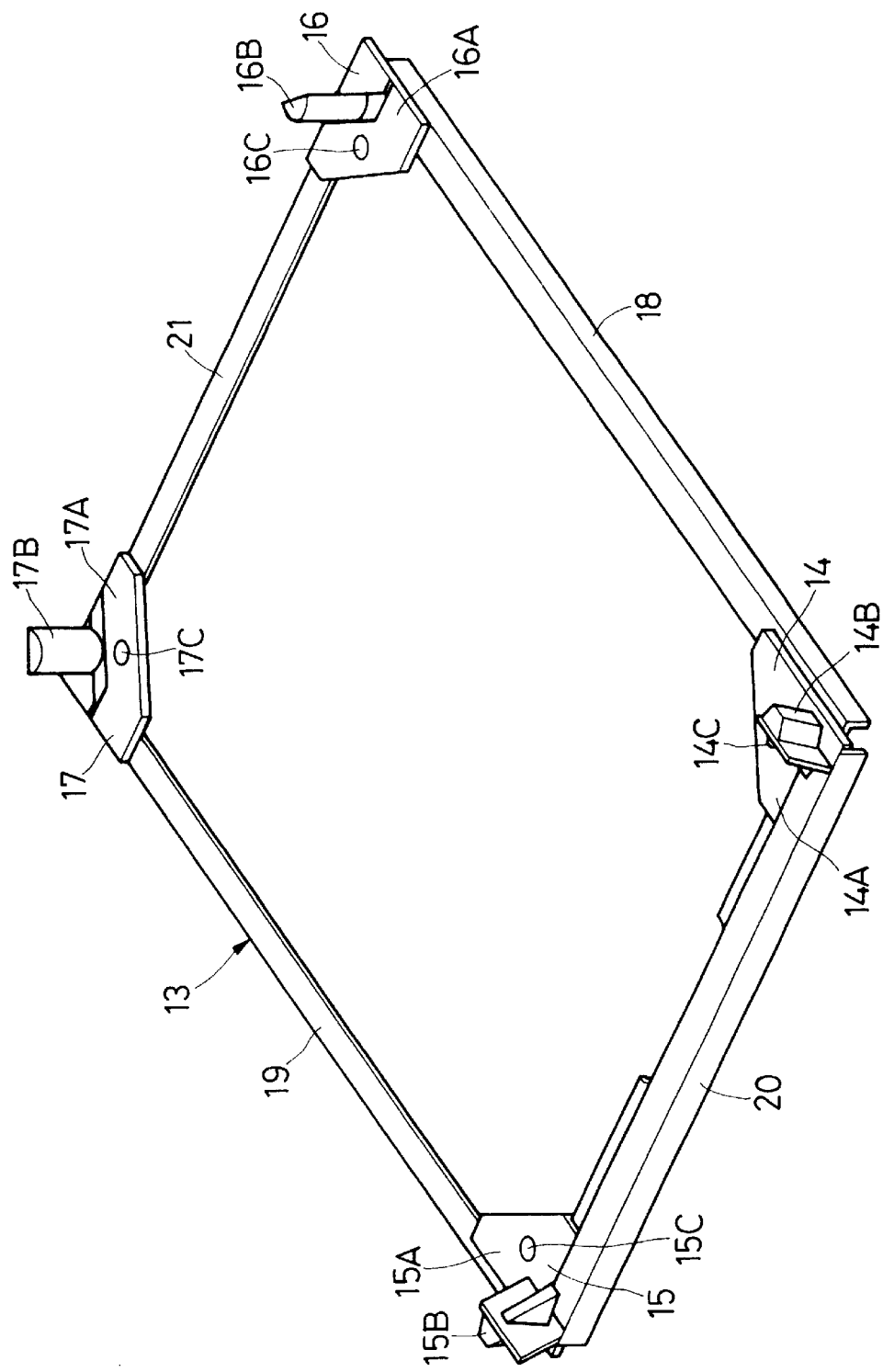
FIG. 9 is an enlarged perspective view of a base frame alone.

Indicated at 13 is the base frame of the cab 11. As shown in FIG. 9, the base frame 13 is in the form of a rectangular frame structure which is constituted by left and right front mount bases 14 and 15, left and right rear mount bases 16 and 17, left and right base link frames 18 and 19, and front and rear base link frames 20 and 21, which will be described hereinafter.

Figure 10:
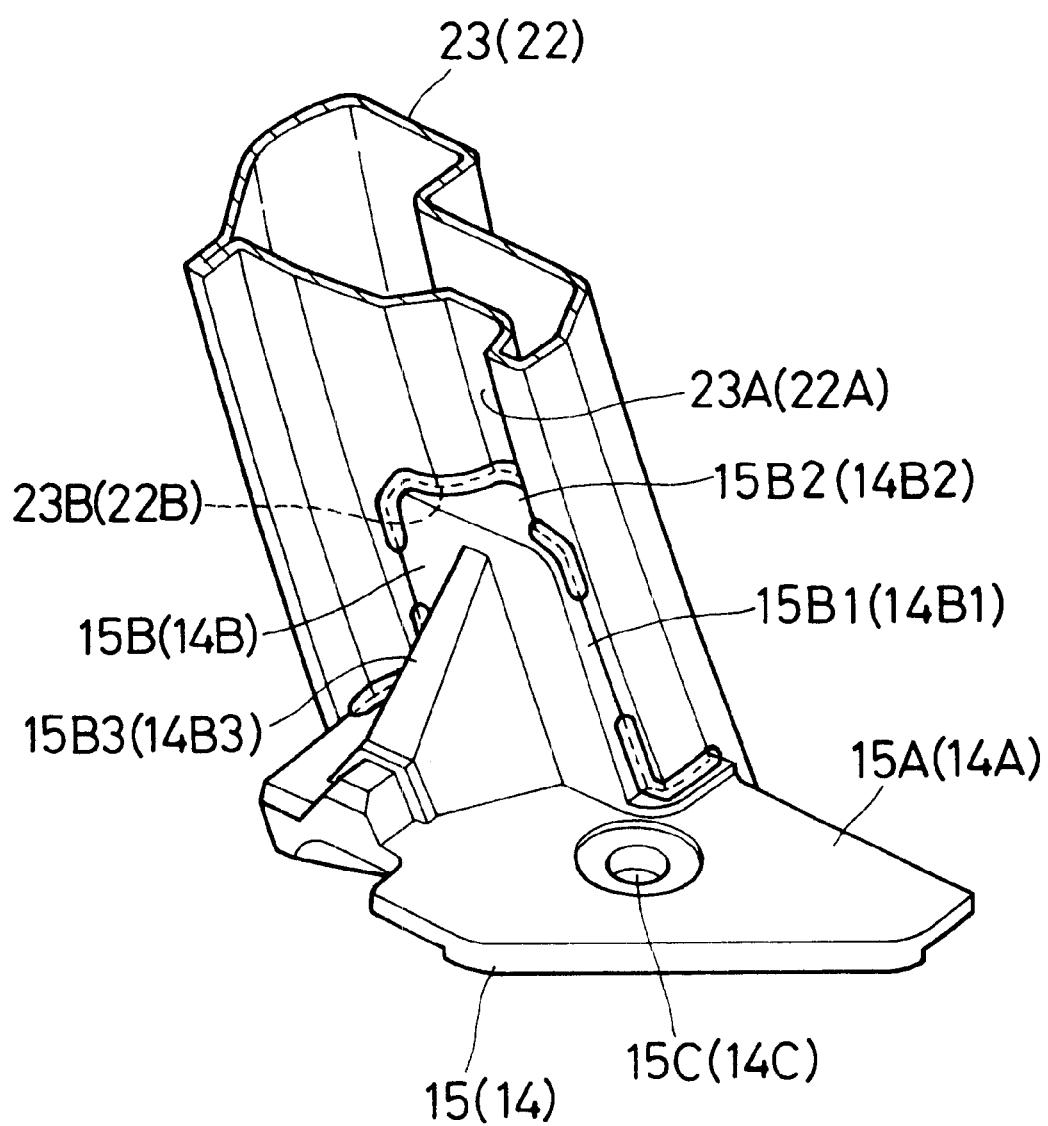
FIG. 10 is an enlarged perspective view of a front pillar which is attached to a front mount base.
Figure 11:
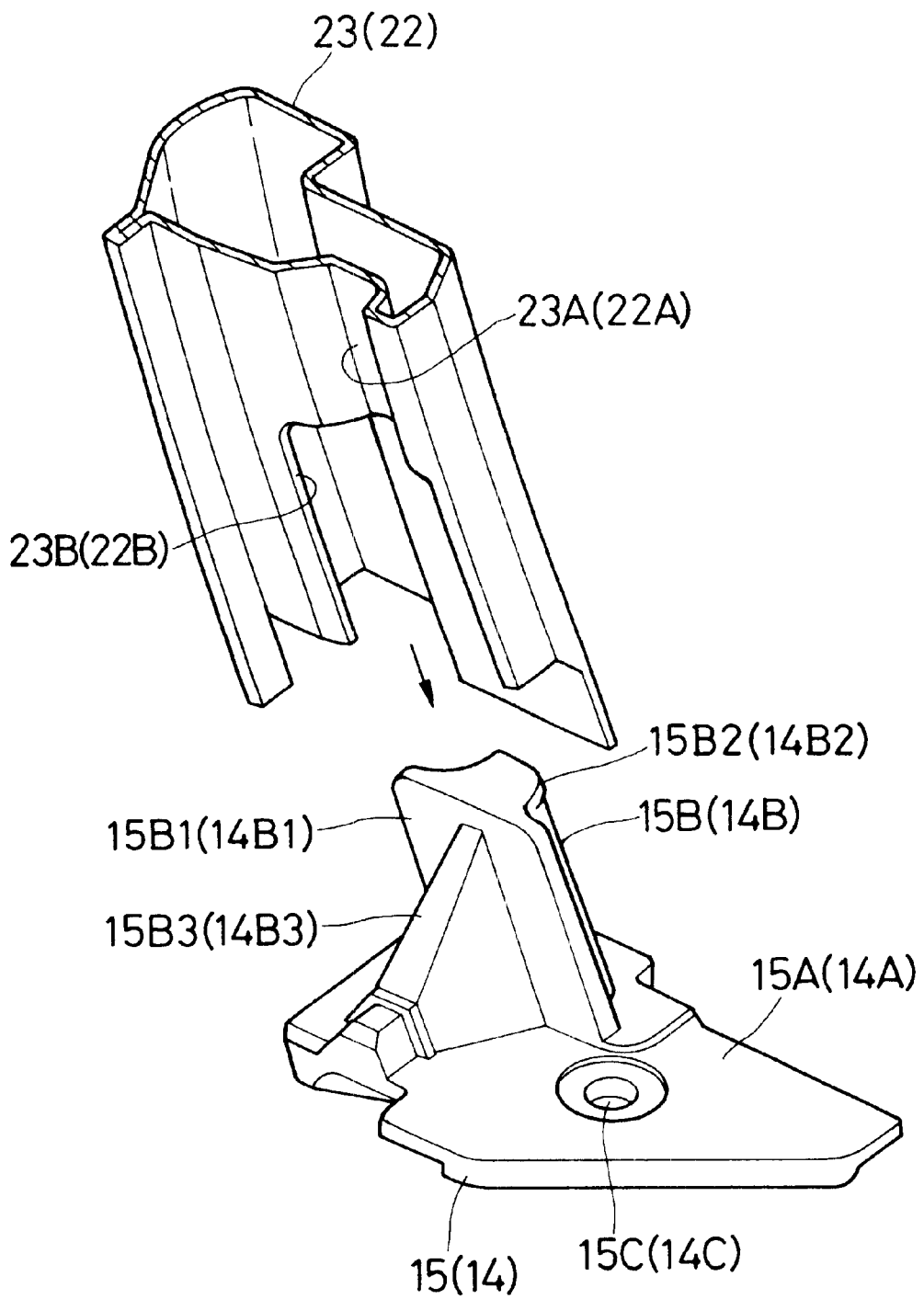
FIG. 11 is an exploded perspective view showing on an enlarged scale the front pillar and the front mount base.

Designated at 14 is the left front mount base which is located at a left front corner of the base frame 13, and at 15 is the right front mount base which is located at a right front corner of the base frame 13. The left front mount base 14 and the right front mount base 15 are in the form of castings which are formed by casting steel material in a mold. As shown in FIGS. 10 and 11, the front mount bases 14 and 15 are constituted by base plates 14A and 15A substantially of triangular shape, and fitting joint projections 14B and 15B which is cast integrally with and projected upward from the base plates 14A and 15A.

In this instance, bolt holes 14C and 15C are bored through the base plates 14A and 15A, respectively. Bolts (not shown) are passed through these bolt holes 14C and 15C at the time of fixing the mount bases 14 and 15 to anti-vibrational mounts (not shown) which support the cab 11 on the revolving frame 4.

The fitting joint projections 14B and 15B are constituted by: upstanding plate portions 14B1 and 15B1 of a substantially rectangular shape rising upward from the respective base plates 14A and 15A and facing laterally outward; ridge portions 14B2 and 15B2 projecting laterally outward from outer faces of the upstanding plate portions 14B1 and 15B1 toward notched portions 22B and 23B in the front pillars 22 and 23, which will be described in greater detail hereinafter; and triangular reinforcing ribs 14B3 and 15B3 which are fitted between the inner side of the upstanding plate portions 14B1 and 15B1 and the base plates 14A and 15A, respectively. Further, the fitting joint projections 14B and 15B need to be fitted in lower end portions of the front pillars 22 and 23. Therefore, the fitting joint projections 14B and 15B are inclined in the forward direction in conformity with the shape of the lower ends of the front pillars 22 and 23, and the ridge portions 14B2 and 15B2 are projected laterally on the outer side.

Accordingly, the fitting joint projections 14B and 15B are fitted in lower end portions of the front pillars 22 and 23, the notched portions 22B and 23B in the front pillars 22 and 23 are closed by the upstanding plate portions 14B1 and 15B1 of the fitting joint projections 14B and 15B, respectively. Further, at this time, the ridge portions 14B2 and 15B2 fit in the notched portions 22B and 23B, respectively. Thus, a weld of a longer distance can be formed when welding the upstanding plate portions 14B1 and 15B1 and the ridge portions 14B2 and 15B2 to the notched portions 22B and 23B of the front pillars 22 and 23. Namely, the front pillars 22 and 23 can be fixed to the mount bases 14 and 15 through a stronger weld. In addition, the reinforcing ribs 14B3 and 15B3 serve to enhance the strength of the mount bases 14 and 15 against falling of the upstanding plate portions 14B1 and 15B1, ridge portions 14B2 and 15B2 and front pillars 22 and 23.

Figure 12:
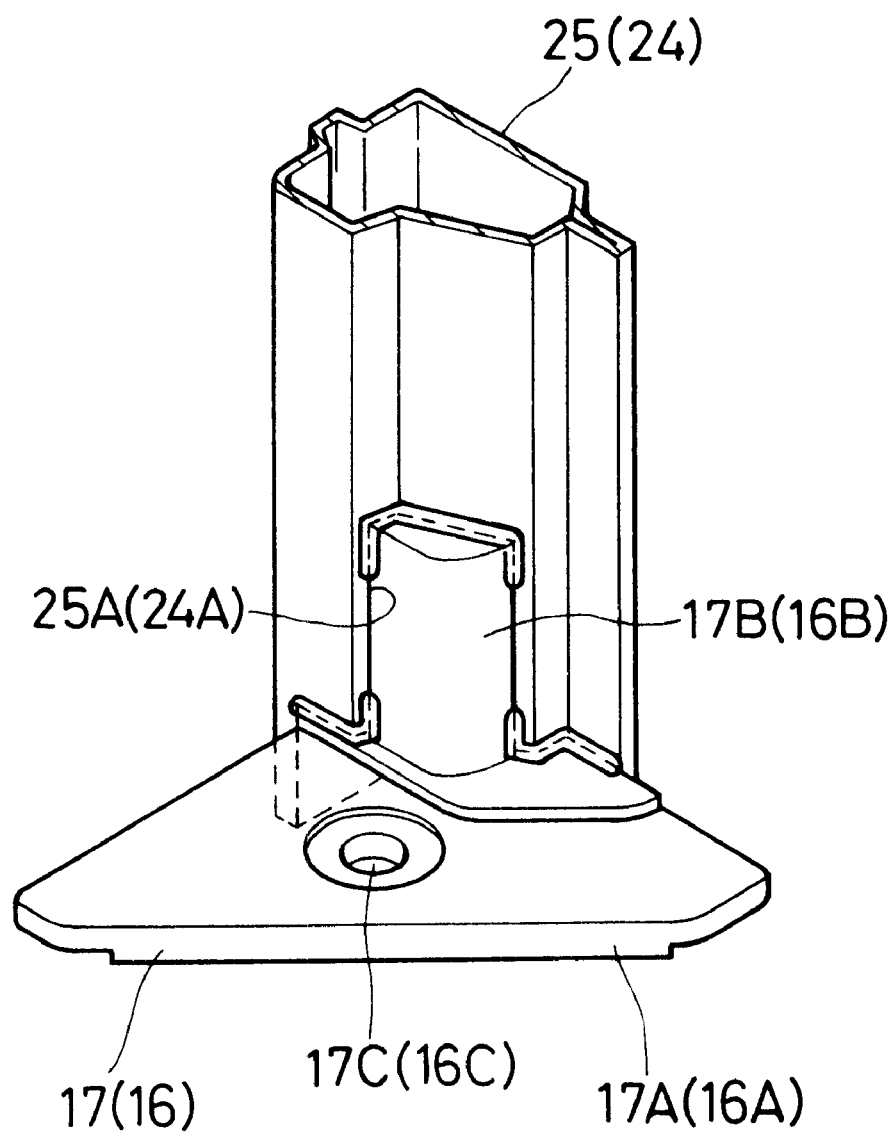
FIG. 12 is an enlarged perspective view of a rear pillar which is attached to a rear mount base.
Figure 13:
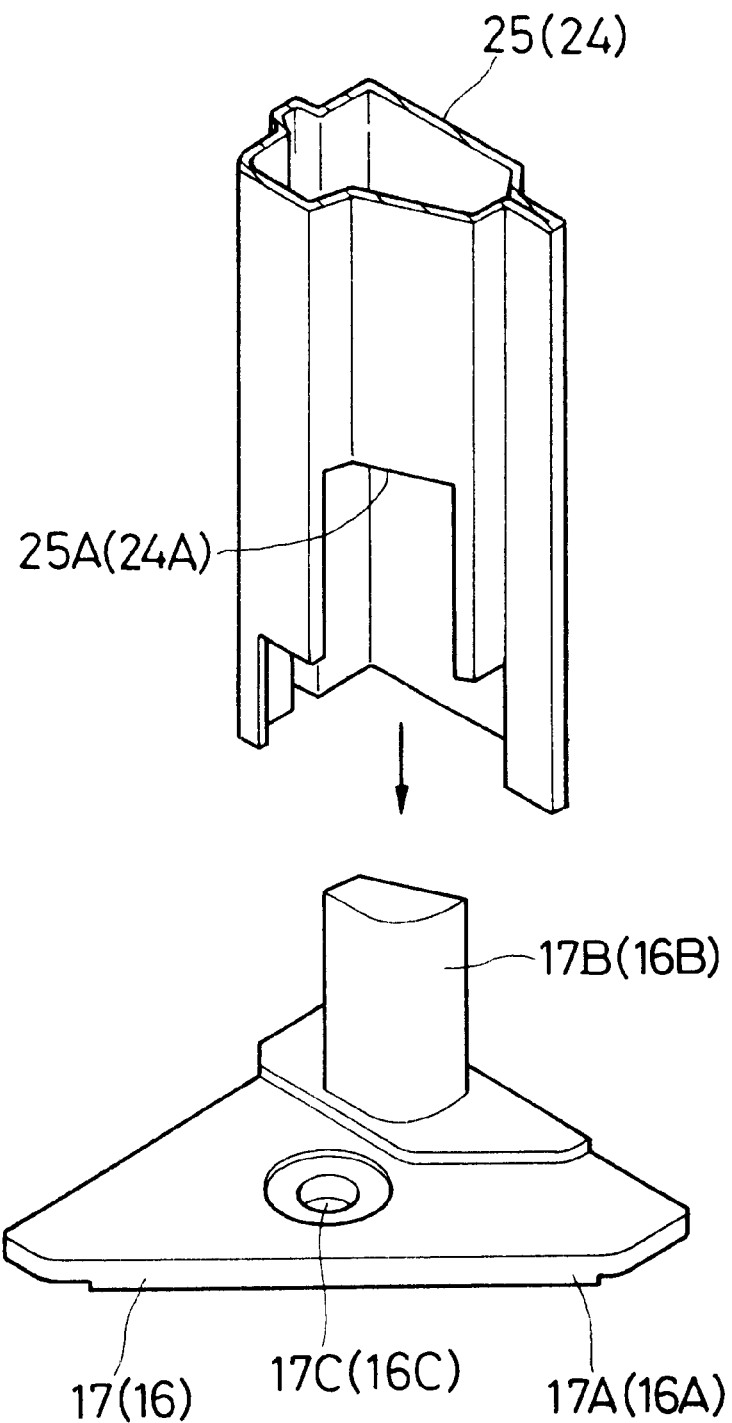
FIG. 13 is an exploded perspective view showing on an enlarged scale the rear mount base and the rear pillar.

Indicated at 16 and 17 are a left rear mount base and a right rear mount base which are located at a left rear corner and a right rear corner of the base frame 13, respectively. Similarly to the front mount bases 14 and 15, the left and right rear mount bases 16 and 17 are castings of steel material. As shown in FIGS. 12 and 13, the rear mount bases 16 and 17 are provided with base plates 16A and 17A of substantially triangular shape and fitting joint projections 16B and 17B which are projected upward from the base plates 16A and 17A. The base plates 16A and 17A and the fitting joint projections 16B and 17B are cast integrally together, respectively.

In this instance, bolt holes 16C and 17C are bored through the base plates 16A and 17A, respectively, and bolts (both not shown) are passed through the bolt holes 16C and 17C at the time of fixing the mount bases 16 and 17 to anti-vibrational mounts on the side of the revolving frame 4. Further, the fitting joint projections 16B and 17B are formed substantially in a semi-circular shape in section and projected straight upward to fit in notched portions 24A and 25A in lower end portions of rear pillars 24 and 25, which will be described hereinafter.

Indicated at 18 is a left base link frame which is connected between the base plate 14A of the left front mount base 14 and the base plate 16A of the left rear mount base 16. Indicated at 19 is a right base link frame which is connected between the base plate 15A of the right front mount base 15 and the base plate 17A of the right rear mount base 17. Indicated at 20 is a front base link frame which is connected between the base plate 14A of the left front mount base 14 and the base plate 15A of the right front mount base 15. Indicated at 21 is rear base link frame which is connected between the base plate 16A of the left rear mount base 16 and the base plate 17A of the right rear mount base 17. These base link frames 18 to 21 are each constituted by an angle bar which is formed by folding a plate into L-shape.

Indicated at 22 is a left front pillar which is located at the left front corner of the base frame 13, and at 23 a right front pillar which is located at the right front corner of the base frame 13. In this instance, the left and right front pillars 22 and 23 are each constituted by a steel pipe of a diversified sectional shape which is formed by drawing an ordinary round steel pipe, and bent to present a forwardly convex profile. Further, for guiding a front window 38 which will be described after, the front pillars 22 and 23 are integrally formed with a roller groove 22A or 23A on one side which comes to a transversely inner side of the front pillars 22 and 23 in an assembled state.

Further, as shown in FIGS. 10 and 11, notched portions 22B and 23B are formed in lower end portions of the front pillars 22 and 23 for fitting engagement with the fitting joint projections 14B and 15B of the front mount bases 14 and 15, respectively. In this instance, the notched portion 22B is formed in a lateral surface at the right side of the left front pillar 22, while the notched portion 23B is formed in a lateral surface at the left side of the right front pillar 23 in face to face relation with the notched portion 22B. Further, the notched portions 22B and 23B are each formed in an inverted U-shape, which is open at the lower end. More specifically, the notched portions 22B and 23B are in the form of openings of a substantially rectangular shape, which fit on the ridge portions 14B2 and 15B2 and which are closed by the upstanding plate portions 14B1 and 15B1 of the front mount bases 14 and 15, respectively, when fitted on the latter.

Of the left and right front pillars 22 and 23 which are arranged as described above, for example, the lower end of the right front pillar 23 is fitted on the fitting joint projection 15B of the right front mount base 15, in such a way that the notched portion 23B is closed by the fitting joint projection 15B, and in this state the two parts are securely fixed to each other by welding. In this instance, in welding the right front pillar 23 to the right front mount base 15, a weld is formed not only around the distal end of the right front pillar 23 which is abutted on the base plate 15A of the right front mount base 15, but also along and between marginal edge portions around the notched portion 23B and the fitting joint projection 15B of the right front mount base 15 (i.e., the upstanding plate portion 15B1 and the ridge portion 15B2), which are in fitting engagement with each other. This welded joint construction makes it possible to prevent concentration of stress in certain localities and to increase the distance of weld and as a result to increase the strength of welded portions. The same applies to the joint construction of the left front pillar 22 and the left front mount base 14.

Indicated at 24 and 25 are a left rear pillar and a right rear pillar which are located in the left and right rear corners of the base frame 13, respectively. In this instance, similarly to the above-described front pillars 22 and 23, the left and right rear pillars 24 and 25 are each constituted by a steel pipe of a diversified shape which is formed by drawing an ordinary round steel pipe.

Further, as shown in FIGS. 12 and 13, formed in lower end portions of the rear pillars 24 and 25 are notched portions 24A and 25A which fit on the protrusive fitting joint projections 16B and 17B of the rear mount bases 16 and 17. In this instance, the notched portion 24A is formed in a lateral surface at the right side of the left rear pillar 24, while the notched portion 25A is formed in a lateral surface at the left side of the right rear pillar 25 in face to face relation with the notched portion 24A. Further, the notched portions 24A and 25A are each formed in an inverted U-shape, which is open at the lower end. More specifically, the notched portions 24A and 25A are in the form of openings of a substantially rectangular shape, which fit on the fitting joint projections 16B and 17B and which are closed by the fitting joint projections 16B and 17B of the rear mount bases 16 and 17, respectively, when fitted on the latter.

Of the left and right rear pillars 24 and 25 which are arranged in the above-described manner, for example, the notched portion 25A of the right rear pillar 25 is fitted on the fitting joint projection 17B of the right rear mount base 17 and, in this state, securely fixed to the latter by welding. In this instance, in welding the right rear pillar 25 to the right rear mount base 17, a weld is formed not only around the distal end of the right rear pillar 25 which is abutted on the base plate 17A of the right rear mount base 17, but also along and between marginal edge portions around the notched portion 25A and the fitting joint projection 17B of the right rear mount base 17, which are in fitting engagement with each other. This welded joint construction makes it possible to prevent concentration of stress in certain localities and to increase the distance of the weld and as a result to increase the strength of welded portions. The same applies to the joint construction of the left rear pillar 24 and the left rear mount base 16.

Indicated at 26 is a left roof pillar which is extended between upper end portions of the left front pillar 22 and the left rear pillar 24, and at 27 is a right roof pillar which is extended between upper end portions of the right front pillar 23 and the right rear pillar 25. The left and right roof pillars 26 and 27 are moderately curved in an upwardly convex shape. Further, on a transversely inner side, the left and right roof pillars 26 and 27 are integrally formed with roller grooves 26A and 27A, respectively.

In this instance, similarly to the above-described left and right front pillars 22 and 23, each one of the left and right roof pillars 26 and 27 is constituted by a steel pipe of a diversified sectional shape, which is formed into a curved shape by a bending operation. A fore end portion of the left roof pillar 26 is connected to an upper end portion of the left front pillar 22 through a left front joint member 28, which will be described hereinafter, while a rear end portion of the left roof pillar 26 is connected to an upper end portion of the left rear pillar 24 through a left rear joint member 30, which will also be described hereinafter. On the other hand, a fore end portion of the right roof pillar 27 is connected to an upper end portion of the right front pillar 23 through a right front joint member 29, which will be described hereinafter, while a rear end portion of the right roof pillar 27 is connected to an upper end portion of the right rear pillar 25 through a right rear joint member 31, which will also be described hereinafter.

Indicated at 28 is the left front joint member 28 which is provided between the left front pillar 22 and the left roof pillar 26, and at 29 is the right front joint member which is provided between the right front pillar 23 and the right roof pillar 27. The left and right front joint members 28 and 29 are each in the form of a square pipe of an arcuately curved shape.

In this instance, the left front joint member 28 is formed with a roller groove 28A longitudinally on an inner lateral side continuously to and from the roller grooves 22A on the left front pillar 22 and the roller groove 26A on the left roof pillar 26. On the other hand, the right front joint member 29 is formed with a roller groove 29A longitudinally on an inner lateral side continuously to and from the roller groove 23A on the right front pillar 23 and the roller groove 27A on the right roof pillar 27.

Further, one end of the left front joint member 28 is fitted in an upper end portion of the left front pillar 22 and securely fixed to the latter by welding, while the other end is fitted in a fore end portion of the left roof pillar 26 and securely fixed to the latter by welding. Consequently, the left front pillar 22 and the left roof pillar 26 are connected to each other through the left front joint member 28. On the other hand, one end of the right front joint member 29 is fitted in an upper end portion of the right front pillar 23 and securely fixed to the latter by welding, while the other end is fitted in a fore end portion of the right roof pillar 27 and securely fixed to the latter by welding. Thus, the right front pillar 23 and the right roof pillar 27 are connected to each other through the right front joint member 29.

Now, indicated at 30 is a left rear joint member which is provided between the left rear pillar 24 and the left roof pillar 26, and at 31 is a right rear joint member which is provided between the right rear pillar 25 and the right roof pillar 27. The left and right rear joint members 30 and 31 are each formed in a hollow box-like shape.

A front side of the left rear joint member 30 is fitted in a rear end portion of the left roof pillar 26 and securely fixed to the latter by welding, while a lower side of the left rear joint member 30 is fitted in an upper end portion of the left rear pillar 24 and securely fixed to the latter by welding. Consequently, the left rear pillar 24 and the left roof pillar 26 are connected to each other through the left rear joint member 30. On the other hand, a front side of the right rear joint member 31 is fitted in a rear end portion of the right roof pillar 27 and securely fixed to the latter by welding, while a lower side of the right rear joint member 31 is fitted in an upper end portion of the right rear pillar 25 and securely fixed to the latter by welding. Thus, the right rear pillar 25 and the right roof pillar 27 are connected to each other through the right rear joint member 31.

Indicated at 32 is a front tie frame (see FIG. 7) which is provided in upper portion at the front end of the cab frame 12. The front tie frame 32 is constituted by a transversely extending elongated plate member. Joint portions at the opposite ends of the front tie frame 32 are securely fixed to the left and right front joint members 28 and 29 by welding. Thus, upper end portions of the front pillars 22 and 23 are transversely connected to each other by the front tie frame 32 through the respective front joint members 28 and 29.

Denoted at 33 is a rear tie frame which is provided in an upper portion at the rear end of the cab frame 12. For instance, the rear tie frame 33 is constituted by a transversely extending elongated square pipe or tube. Joint portions at the opposite ends of the rear tie frame 33 are securely fixed to the left and right rear joint members 30 and 31 by welding. Thus, upper end portions of the respective rear pillars 24 and 25 are transversely connected to each other by the rear tie frame 33 through the rear joint members 30 and 31.

Indicated at 34 is an intermediate rear tie frame which is provided at the rear end of the cab frame 12, at a spaced position and on the lower side of the rear tie frame 33. The intermediate rear tie frame 34 is constituted by a transversely extending plate which is folded into a rod-like shape. Opposite ends of the intermediate rear tie frame 34 are securely fixed to vertically intermediate portions of the left and right rear pillars 24 and 25 by welding. Thus, at vertically intermediate portions, the respective rear pillars 24 and 25 are transversely connected to each other by the intermediate rear tie frame 34.

Indicated at 35 is a center pillar which is provided at the left side of the cab frame 12. The center pillar 35 is in the form of a hollow structure, fabricated by welding together inner and outer panels 36 and 37 which are pressed substantially into a L-shape in section. The center pillar 35 is composed of a vertically extending pillar section 35A, and a side panel section 35B which is extended rearward from a lower portion of the vertical pillar section 35A.

The center pillar 35, which is arranged in the above-described manner, is located in an intermediate position between the front and rear ends of the cab frame. Lower end portions of the pillar section 35A and the side panel section 35B are securely fixed to the left base link frame 18 of the base frame 13 by welding, while an upper end portion of the pillar section 35A is securely fixed to the left roof pillar 26 by welding.

Indicated at 38 is a front window which is provided at the front side of the cab frame 12. The front window 38 is movable along the roller grooves 23A on the two front pillars 22 and 23, the roller grooves 27A on the two roof pillars 26 and 27 and the roller grooves 29A on the two front joint members 28 and 29. The front window 38 is normally held in a closed position between the left and right front pillars 22 and 23 as shown in FIG. 6, but it can be lifted into an open position between the left and right roof pillars 26 and 27, namely, into an open position under the roof panel 44 which will be described hereinafter.

Indicated at 39 is a door which is fitted between the center pillar 35 and the left front pillar 22. As shown in FIG. 4, the door 39 is pivotally connected to the center pillar 35 at its rear side by means of hinges 40 as a swing door.

Indicated at 41 is a rear panel which is formed of a metal sheet, and the rear panel 41 is fitted between the left and right rear pillars 24 and 25 in such a way as to shield the rear side of the cab frame 12. Designated at 42 is a corner panel which is similarly formed of a metal sheet, and the corner panel 42 is fitted on the left rear pillar 24 in such a way as to cover the latter. Indicated at 43 is a side panel which is formed of a metal sheet, and the side panel 43 is securely fixed to the right base link frame 19, right front pillar 23 and right rear pillar 25 in such a way as to shield the right side of the cab frame 12. Indicated at 44 is a roof panel which is formed of a metal sheet, and the roof panel is securely fixed to the left and right roof pillars 26 and 27, the front tie frame 32 and the rear tie frame 33.

Further, denoted at 45 is a pane of lower front window glass which is fitted between front base link frame 20 and the left and right front pillars 22 and 23 under the front window 38. Indicated at 46 is a pane of rear window glass which is fitted between the left and right rear pillars 24 and 25 and between the rear tie frame 33 and the rear panel 41. Indicated at 47 is a pane of left side window glass which is fitted in position between the center pillar 35 and the corner panel 42. Further, indicated at 48 is a pane of right side window glass which is fitted in position between the right front pillar 23 and the right rear pillar 25.

The hydraulic excavator according to the present invention, with the arrangements as described above, is operated in the manner as follows.

Firstly, on a working site, a vehicle drive lever is turned by an operator in the cab 11 to drive the lower structure 1 in the forward or reverse direction. At the time of a ground excavating operation, control levers are turned to operate the front working mechanism 3 and to rotate the upper structure 2.

For assembling the cab 11, the front pillars 22 and 23 are firstly attached to the front mount bases 14 and 15 and other component parts are assembled, for example, in the order and in the manner as described below.

More specifically, in the first place, the front pillars 22 and 23 are attached to the front mount bases 14 and 15 by fitting the notched portions 22B and 23B on the fitting joint projections 14B and 15B as indicated by an arrow in FIG. 11. At this time, by fitting engagement of the notched portions 22B and 23B with the fitting joint projections 14B and 15B, the front pillars 22 and 23 can be readily set in correct positions relative to the front mount bases 14 and 15, respectively.

After assembling the front pillars 22 and 23 with the front mount bases 14 and 15 in the above-described manner, lower end portions of the front pillars 22 and 23 are welded to the base plates 14A and 15A of the front mount bases 14 and 15 in the manner as shown in FIG. 10. Further, marginal edge portions around the notched portions 22B and 23B are also welded to the fitting joint projections 14B and 15B to fix the front pillars 22 and 23 more securely to the front mount bases 14 and 15, respectively.

As described above, marginal edge portions around the notched portions 22B and 23B are also welded to the fitting joint projections 14B and 15B, respectively. Therefore, it becomes possible to form a weld or welds avoiding those portions where concentration of stress is likely to occur, and to increase the distance of weld for the purpose of enhancing the strength of the welded joint portions to a sufficient degree.

On the other hand, for assembling the rear pillars 24 and 25, the two rear pillars 24 and 25 are attached to the rear mount bases 16 and 17 by fitting the notched portions 24A and 25A on the fitting joint projections 16B and 17B of the rear mount bases 16 and 17, respectively, as indicated by an arrow in FIG. 13. At this time, by fitting engagement of the notched portions 24A and 25A with the fitting joint projections 16B and 17B, the rear pillars 24 and 25 can be readily set in correct positions relative to the rear mount bases 16 and 17.

After setting the rear pillars 24 and 25 on the rear mount bases 16 and 17, lower end portions of the rear pillars 24 and 25 are welded to the base plates 16A and 17A of the rear mount bases 16 and 17 as shown in FIG. 12. In addition, a weld is formed along marginal edge portions around the notched portions 24A and 25A, which are in abutting engagement with the fitting joint projections 16B and 17B, to fix the rear pillars 24 and 25 securely to the respective rear mount bases 16 and 17.

Thus, by forming a weld along marginal edges around the notched portions 24A and 25A which are in abutting engagement with the fitting joint projections 16B and 17B, the strength of the welded joint portions can be enhanced in the same way as the welding of the front pillars 22 and 23 and the front mount bases 14 and 15 described above.

Now, the roof pillars 26 and 27 are attached to the upper ends of the front pillars 22 and 23 and the rear pillars 24 and 25 through the front joint members 28 and 29 and the rear joint members 30 and 31. Then, the front joint members 28 and 29 and the rear joint members 30 and 31 are transversely connected to each other by the front tie frame 32 and the rear tie frame 33, respectively. Further, the center pillar 35 is attached to the left base link frame 18 of the base frame 13 and the left roof pillar 26 to finish the assembling of the cab frame 12.

After assembling the cab frame 12 in this manner, the front window 38, door 39, rear panel 41, corner panel 42, side panel 43, roof panel 44, low front window glass 45, rear window glass 46, left side window glass 47 and right side window glass 48 are successively fitted in or on the cab frame 12 to assemble the cab 11.

Thus, according to the present embodiment, since the fitting joint projections 14B to 17B of the mount bases 14 to 17 are cast integrally with the respective base plates 14A to 17A, the pillars 22 to 25 can be set in position on the mount bases 14 to 17 simply by fitting them on the fitting joint projections 14B to 17B, respectively. Namely, the fitting joint projections 14B to 17B serve to position the pillars 22 to 25 correctly and readily on the base frame 13, and thus contribute to improve the efficiency of assembling work, not to mention the productivity of the cab.

In addition, the pillars 22 to 25 which are provided with the notched portions 22B, 23B, 24A and 25A respectively in their lower end portions can be securely fixed to the mount bases 14 to 17 by welding, with the notched portions 22B, 23B, 24A and 25A in fitting engagement with the fitting joint projections 14B to 17B on the side of the mount bases 14 to 17. Therefore, in welding lower ends of the pillars 22 to 25, a weld can also be formed along marginal edge portions around the notched portions 22B, 23B, 24A and 25A which are in abutting engagement with the fitting joint projections 14B to 17B, respectively.

In welding lower end portions of the pillars 22 to 25, the above arrangements permit to form a weld or welds avoiding distal or root end portions of the pillars where concentration of stress will occur, and to increase the welding distance along marginal edge portions around the notched portions 22B, 23B, 24A and 25A to improve the strength of welded joint portions and reliability of the machine.

Further, since the mount bases 14 to 17 are provided with bolt holes 14C to 17C, respectively, these mount bases 14 to 17 can be fixed on anti-vibrational mounts which are provided on the revolving frame 4 to support the cab 11 thereon, by means of bolts which are passed through the respective bolt holes 14C to 17C.

On the other hand, the structures of the front mount bases 14 and 15 as well as the rear mount bases 16 and 17 are castings of steel material, the fitting joint projections 14B to 17B can be cast integrally with the base plates 14A to 17A of the mount bases 14 to 17, respectively, and therefore the whole mount bases including the fitting joint projections can be fabricated at a low cost.

Furthermore, the left and right front pillars 22, 23 as well as the rear pillars 24 and 25 are each constituted by a steel pipe of a diversified sectional shape which is formed by drawing an ordinary round steel pipe, so that they can also be fabricated easily at a low cost.

Figure 14:
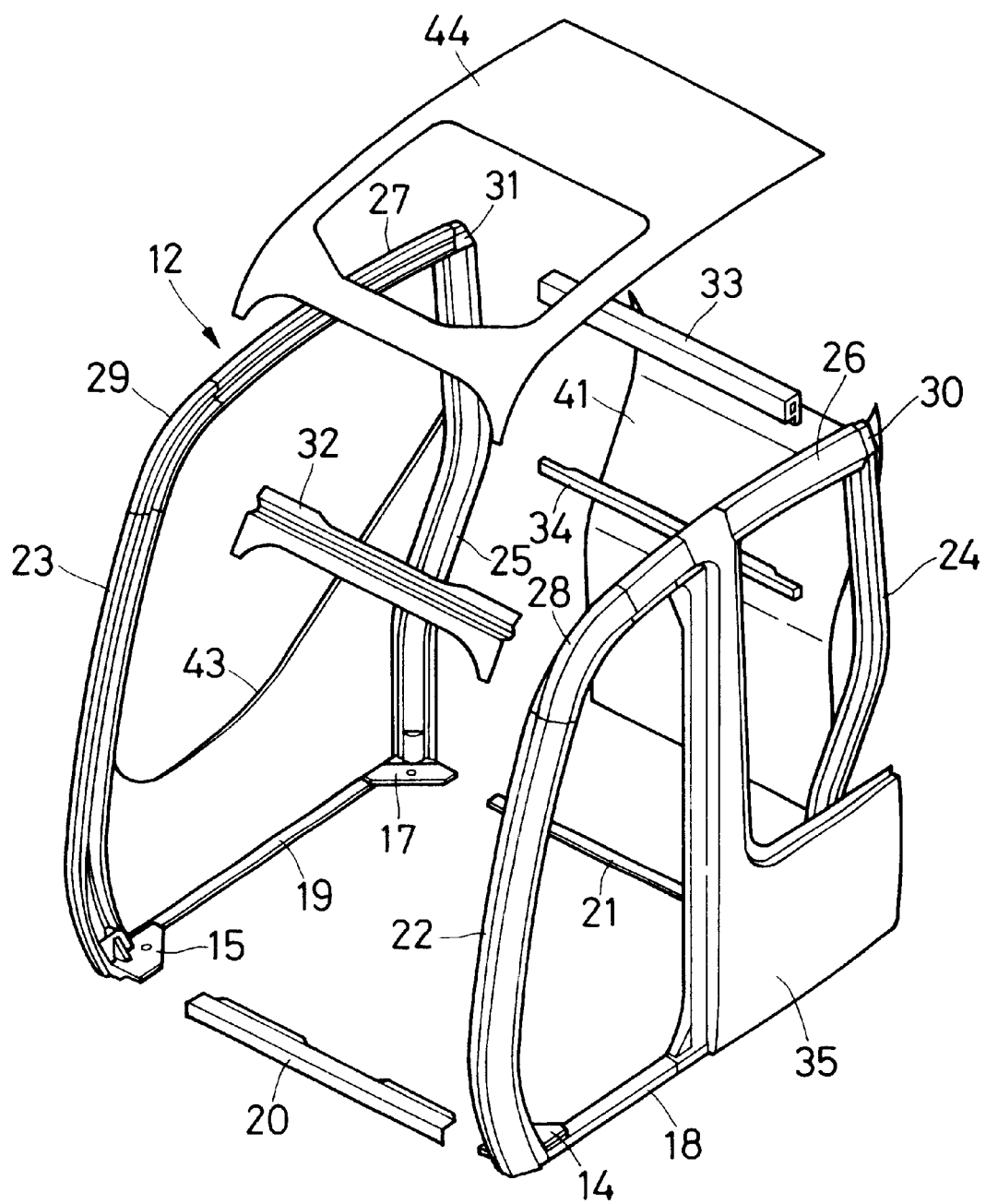
FIG. 14 is an exploded perspective view of a cab frame in a modification of the present invention, explanatory of an order of cab assembling steps.

In the foregoing embodiment, it has been described by way of example that, in assembling the cab 11, the base frame 13 is assembled in the first place by connecting the mount bases 14 to 17 with the base link frames 18 to 21, and then the front pillars 22 and 23 and the rear pillars 24 and 25 are successively attached to the base frame 13. However, the present invention is not limited to the particular example given. For instance, the cab 11 may be assembled as in the case of a modification shown in FIG. 14. More specifically, in this case, a left section of the cab 11 is assembled by the use of the component parts on the left side including the mount bases 14 and 16, base link frame 18, front pillar 22, rear pillar 24, roof pillar 26 and center pillar 35, separately from a right section of the cab 11 which is similarly assembled by the use of the component parts on the right side including mount bases 15 and 17, base link frame 19, front pillar 23, rear pillar 25 and roof pillar 27. After assembling the left and right sections separately, the resulting two assemblies are connected with each other by means of the base link frames 20 and 21, front tie frame 32, rear tie frames 33 and 34, rear panel 41 and roof panel 44.

Further, in the foregoing embodiment, it has been described by way of example to connect the front pillars 22 and 23 with the roof pillars 26 and 27 through the front joint members 28 and 29, respectively, and to connect the rear pillars 24 and 25 with the roof pillars 26 and 27 through the rear joint members 30 and 31, respectively. However, the present invention is not limited to this particular example. For instance, arrangements may be made to fix the front and rear pillars directly to the roof pillars by welding or by other suitable means.

Further, in the foregoing embodiment, it has been described that structures of the front mount bases 14 and 15 as well as the structures of the rear mount bases 16 and 17 are formed by casting steel material in a mold. However, it is to be understood that the present invention is not limited to cast mount bases. Of course, the respective mount bases 14 to 17 may be formed by forging or machining if desired.

Moreover, in the foregoing embodiment, by way of example the construction machine cab 11 of the present invention has been described as a cab of a hydraulic excavator. However, the present invention is not limited to the particular example shown. For example, the present invention can be similarly applied to hydraulic cranes or other construction machines.

Industrial Applicability

As clear from the foregoing detailed description, according to the present invention, each one of front and rear pillars is provided with a notched portion in a lower end portion for fitting engagement with a fitting joint projection on the side of a mount base, and securely fixed to the mount base by forming a weld along and between marginal edge portions around the notched portion and the fitting joint projection which are in abutting engagement with each other.

Accordingly, by fitting engagement with the fitting joint projections on the side of the respective mount bases, each one of the front and rear pillars can be readily and correctly set in position on the mount base. This contributes to improve the efficiency of assembling work and to enhance the productivity. Besides, a weld can be formed along and between marginal edge portions around the notched portion and the fitting joint projection which is in abutting engagement with the notched portion. Therefore, in welding a pillar to a mount base, it becomes possible to prolong the welding distance and to avoid distal end portions of the pillar where concentration of stress is likely to occur. Thus, the strength of the welded joint portion can be enhanced to a marked degree.

What is claimed is:

1. A cab for construction machines, including mount bases located at four corners and each provided with an upward fitting joint projection, base link frames arranged to connect said mount bases in transverse and longitudinal directions of a machine;
   left and right front pillars erected on left and right front mount bases;
   left and right rear pillars erected on left and right rear mount bases;
   left and right roof pillars arranged to longitudinally connect upper end portions of said front and rear pillars;
   a front tie frame arranged to transversely connect upper end portions of said left and right front pillars;
   and a rear tie frame arranged to transversely connect upper end portions of said left and right rear pillars;
   characterized in that said cab comprises:
      a notched portion provided in a lower end portion of each one of said front and rear pillars for fitting engagement with said fitting joint projection of said mount base;
      a lower end portion of each one of said front and rear pillars being fitted on said fitting joint projection of said mount base and securely fixed to the latter by a weld formed along and between marginal edge portions around said notched portion and said fitting joint projection.

2. A cab for construction machines as defined in claim 1, wherein said notched portion in each one of said front and rear pillars is in the form of an opening of an inverted U-shape corresponding to profile of said fitting joint projection.

3. A cab for construction machines as defined in claim 1, wherein said mount bases are each constituted by a base plate to be fixed on the side of a vehicle body, and a fitting joint projection rising upward from said base plate in such a way as to plug said notched portion.

* * * * *